(12) United States Patent
Vera

(10) Patent No.: US 6,469,869 B1
(45) Date of Patent: Oct. 22, 2002

(54) LOW MASS BASEPLATE FOR DISK DRIVE SUSPENSION

(75) Inventor: Daniel Vera, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 189 days.

(21) Appl. No.: 09/612,351

(22) Filed: Jul. 6, 2000

Related U.S. Application Data

(60) Provisional application No. 60/197,794, filed on Apr. 14, 2000.

(51) Int. Cl.[7] .................................................. G11B 5/48
(52) U.S. Cl. .................................. 360/244.5; 360/244.6
(58) Field of Search ............................ 360/244.5–244.7

(56) References Cited

U.S. PATENT DOCUMENTS 5,812,343 A * 9/1998 Budde et al. ............ 360/244.6

6,160,684 A * 12/2000 Heist et al. ............... 360/244.5

FOREIGN PATENT DOCUMENTS

EP 991055 A1 * 4/2000 ............ G11B/5/48

* cited by examiner

Primary Examiner—William Klimowicz
(74) Attorney, Agent, or Firm—Louis J. Bachand

(57) ABSTRACT

A low mass baseplate for attaching a suspension load beam to an actuator arm has a planar portion weld-attachable to a load beam base and a cylindrical boss portion attachable to an actuator arm, the planar portion is locally relieved to reduce mass while maintaining the baseplate effectiveness at the load beam spring portion. The baseplate relief is specially sized and configured to be free of entanglements during tumble deburring operations.

14 Claims, 2 Drawing Sheets

LOW MASS BASEPLATE FOR DISK DRIVE SUSPENSION

CROSS-REFERENCE TO RELATED APPLICATIONS

This application claims the benefit of U.S. provisional application Ser. No. 60/197,794, filed Apr. 14, 2000.

Statement Regarding Federally Sponsored Research or Development

Not Applicable

Reference to a Microfiche Appendix

Not Applicable

BACKGROUND OF THE INVENTION

1. Field of the Invention

This invention relates to mount baseplates for mounting load beams to actuator arms in disk drive suspensions, and more particularly to an improved mount baseplate having reduced mass while maintaining a thickness desirable for mechanical properties, the mass reduction being made at performance-noncritical areas of the baseplate.

2. Description of the Related Art

Typically a disk drive suspension comprises a steel load beam having a base section that is weld-attached to a mount comprising a baseplate. The baseplate is attached to the drive actuator arm such as by swaging the baseplate boss into engagement with an aperture in the arm. Typical thicknesses of the 0.200 by 0.200 inch planar portion of the, baseplates are in the range of 0.004 inch at a minimum to 0.008 inch that is currently preferred. The lower thicknesses may not provide adequate mechanical properties. Since the area is reasonably unchangeable, reducing the baseplate mass has centered on reduced thickness in the planar portion, but thicknesses are presently at the minimum.

BRIEF SUMMARY OF THE INVENTION

It is an object of the invention, therefore, to provide for use in disk drive suspensions an improved baseplate that has reduced mass but that maintains the desired thickness for mechanical properties. It is a further object to contour the common baseplate in areas not critical to performance to reduce mass without undue loss in mechanical properties. Yet another object is to provide a novel shape in a baseplate that accommodates all mechanical requirements, such as maintaining the base plate edge at the load beam spring section, keeping a minimum thickness or greater, and providing distributed welding sites, while having a reduced mass.

These and other objects of the invention to become apparent hereinafter are realized in a low mass baseplate for attaching a suspension load beam having a rigid section, a spring section and a base section by its the base section to an actuator arm, the baseplate comprising a planar portion attachable to the load beam base and integrally formed therewith a boss portion attachable to an actuator arm, the planar portion having a front edge and a rear edge and left and right lateral edges therebetween, the boss portion comprising a cylinder spaced inwardly from the planar portion edges and having a given outside diameter, the planar portion having a front edge recess in mass reducing relation, the recess defining with the left and right edges respectively left and right legs, the legs having a lateral extent greater than the boss portion outside diameter, whereby adjacent baseplates do not become entangled with each other in tumble deburring operations.

In this and like embodiments, typically, the left and right leg portions define left and right front edges, the edges being adjacent left and right spring areas respectively of the load beam spring section, the baseplate rear edge and the left and right lateral edges are radiused at their intersection in mass reducing relation, and the baseplate rear edge comprises a smooth curve commencing at the center of the rear edge and terminating on the left and right lateral edges of the planar portion at left and right points opposed across the boss.

Typically, the planar portion and the load beam base section are welded to each other at laterally and longitudinally distributed points between the most rearward part of the boss and the planar portion front edge.

Preferably, the recess is V-shaped with its open mouth adjacent the load beam spring section, or the recess has the shape of the interior opening in a U with its open mouth adjacent to the load beam spring section.

In a further embodiment, the invention provides a low mass baseplate for attaching a suspension load beam having a rigid section, a spring section and a base section by its the base section to an actuator arm, the baseplate comprising a metal planar portion weld-attachable to the load beam base and integrally formed therewith a cylindrical boss portion attachable to an actuator arm, the planar portion having a front edge and a rear edge and left and right lateral edges therebetween, the boss portion comprising a cylinder spaced inwardly from the planar portion edges and having a given outside diameter, the planar portion having a distal front edge recess coaxial with the boss portion and spaced therefrom, the recess being devoid of metal in mass reducing relation, the recess defining with the left and right edges respectively left and right legs, the legs having a lateral extent greater than the boss portion outside diameter, whereby juxtaposed baseplates do not become entangled with each other in tumble deburring operations.

In this and like embodiments, typically, the low mass baseplate planar portion recess has an extent along its lateral axis greater than its extent normal to the lateral axis, the recess terminates inwardly in a pointed or radiused terminal, the left and right leg portions define left and right front edges, the edges being adjacent left and right spring section areas respectively of the load beam spring section, the baseplate rear edge and the left and right lateral edges are radiused at their intersection in mass reducing relation, and the baseplate rear edge comprises a smooth curve commencing at the center of the rear edge and terminating on the left and right lateral edges of the planar portion at left and right points opposed across the boss.

The invention further provides in combination, the low mass baseplate described and a load beam having a base section, the baseplate planar portion being weld-attached to the load beam base section at laterally and longitudinally distributed points between the most rearward part of the boss and the planar portion front edge.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
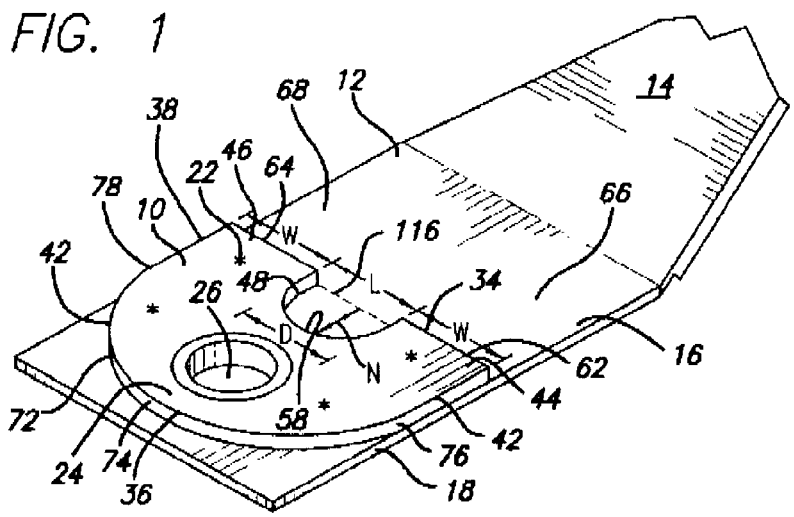
FIG. 1 is an oblique view of the invention baseplate and load beam.

The great need for a low-mass baseplate mount design arises in part from the disk drive industry conversion to the pico form factor and in part from the simultaneous introduction of increased shock resistance requirements. All new disk drive programs will require a new level of baseplate mass as shock resistance characteristics become more critical, and as all future designs are critically evaluated to be sure no factor affecting performance is overlooked. The mass of the baseplate becomes critical as the total suspension mass becomes critical. The possibility of further reduction in the baseplate planar portion, or flange, thickness and hence of the mass is nonexistent since as the flange is already as low as 0.006 inches commonly and sometimes as little as 0.004 inches. Further reductions in flange thickness will compromise the purpose of the flange: to provide a stable and rigid base for the suspension spring section and distal end features. Recently introduced novel shapes such as the "Ninja Star" type while reducing the mass are difficult to manufacture, especially to deburr, because of their many interior surfaces that enable entanglement of juxtaposed baseplates.

The invention design, by contrast, has no interior surfaces that can entangle. The invention design allows in manufacturing operations optimization of material usage, and easy post-processing such as deburring and tumbling, and provides a low-mass base plate. Thus the invention design delivers the needed performance and makes the part manufacturable.

As mentioned above, the recess in the baseplate can have a U-shape or a V-shape with a variable width and length, or any shape that removes a part of the baseplate volume and yet retains the force effect of the baseplate forward edge on the load beam spring section, and supports cantilevered rigid section as needed, all without a reduction in desirable thickness in the baseplate. Preferably the recess removes as much of the baseplate as possible while keeping distributed areas for welding of the baseplate to the load beam and the aforementioned needed mechanical features. In practice the rear edge of the baseplate is also contoured to have a suitable radius for further mass reduction without affecting performance or causing difficulties in manufacturing operations.

The width of the legs formed by the recess and the side edges as described herein typically has a lateral width (from side edge to closest recess edge) of 0.0650 inch across) provided that width is larger than the size of the boss portion outside diameter. The boss will typically have an outside diameter of 0.0660 inch. This relationship smaller boss outside diameter and greater leg lateral width acts to prevent the intertwining of the baseplates during their tumble deburring in post-processing. As noted above, the baseplate thickness should be at least 0.004 inch, and optimally 0.006 to 0.008 inch.

The invention design thus addresses the post-processing of a reduced mass baseplate and delivers a solution thereto. In addition, the baseplate edges next to the spring section area are kept essentially intact despite the nonessential elimination of mass area. Weld points are preserved for attaching the base plate to the load beam.

Figure 2:
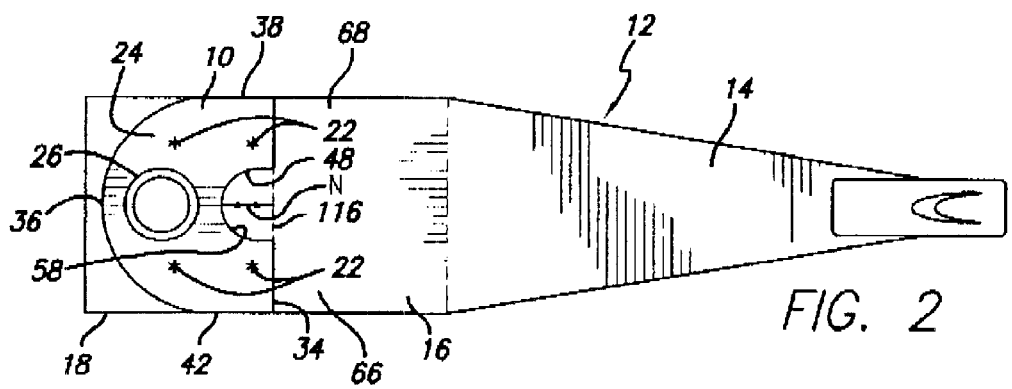
FIG. 2 is a top plan of thereof.
Figure 3:
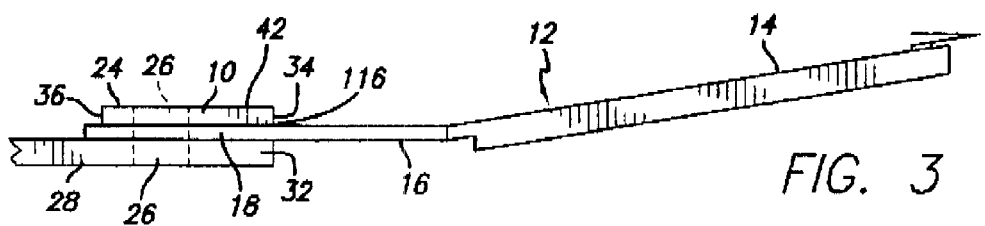
FIG. 3 is a side elevation view thereof.

With reference now to the drawings in detail in FIGS. 1–3 the invention low mass baseplate 10 attaches to suspension load beam 12 having a rigid section 14, a spring section 16, and a base section 18, by welding, e.g. at points 22, the load beam base section. The baseplate 10 comprises a typically metal planar portion 24 that is weld-attached to the load beam base section 18, and integrally formed therewith, a typically cylindrical boss portion 26 that attaches by swaging to aperture 28 in actuator arm 32.

Baseplate planar portion 24 is a flange that has a front edge 34 and a rear edge 36 and left and right lateral edges 38, 42 respectively therebetween. The cylindrical boss portion 26 is spaced inwardly as shown from the planar portion edges 34, 36, 38 and 42. Boss portion 26 has a given outside diameter D that is considered when sizing the lateral width W of the legs 44, 46 so as to properly size the recess 48 therebetween, as hereinafter more fully explained.

For mass reduction, the baseplate planar portion 24 distal front edge recess 48 is preferably coaxial with the boss portion 26 and spaced distally therefrom. Recess 48 is devoid of metal so as to effect mass reduction. Recess 48 defines with the baseplate left and right edges 38, 42 respectively left and right legs 44, 46. Legs 44, 46 each have a lateral extent or width W that defines the lateral extent L of the recess 48 to be greater than the outside diameter D of boss portion 26. Since they are unable to engagingly interfit or interlock although tumbled in juxtaposition, recess 48 and boss 26 and thus their respective baseplates 10 do not become entangled with each other in tumble deburring operations.

Figure 4:
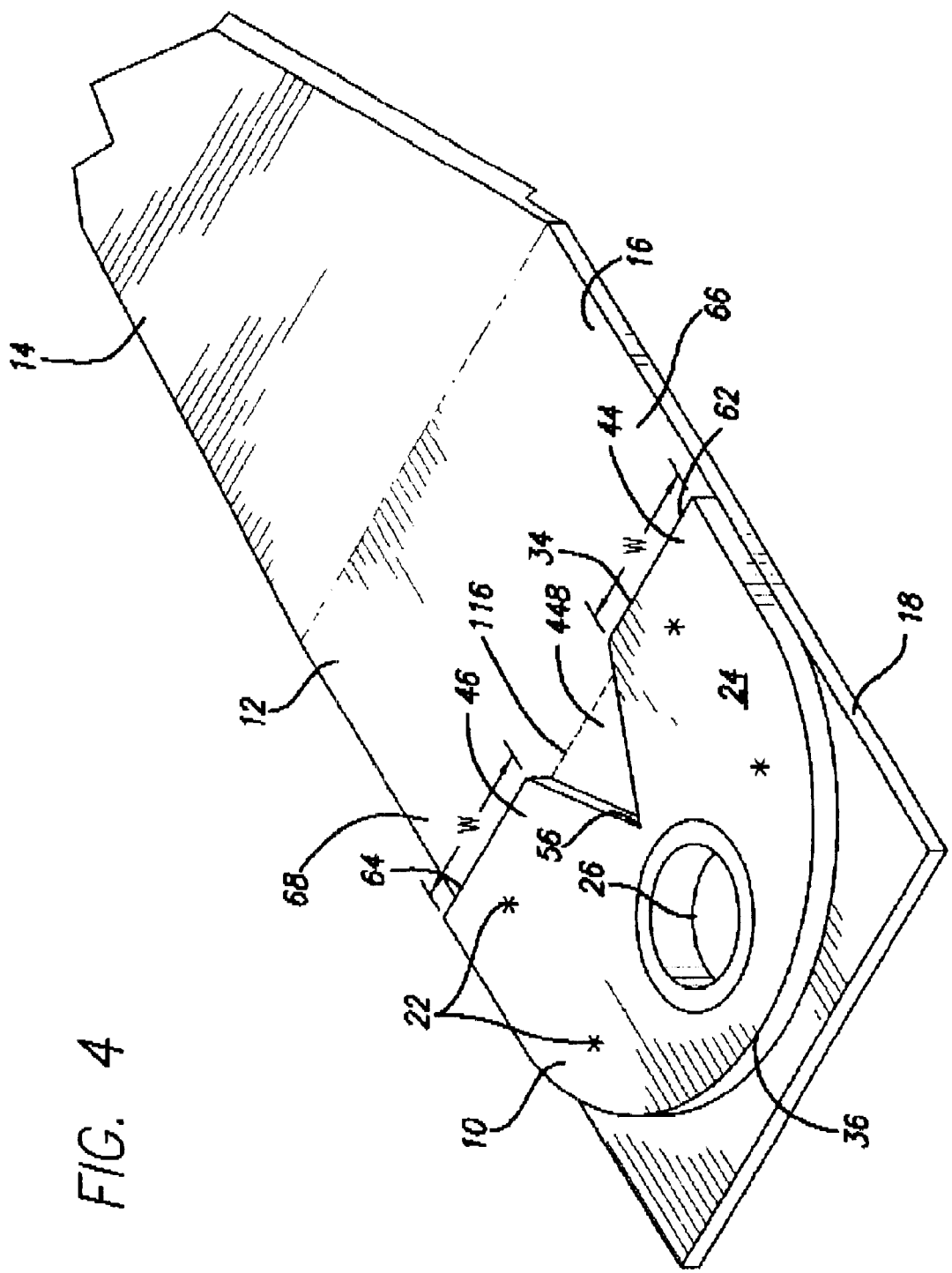
FIG. 4 is a view like FIG. 2 of an alternative embodiment.

In particular cases, the extent L of the low mass baseplate planar portion recess 48 along its lateral axis is less than its extent N normal to the lateral axis. Preferably, the recess 48 terminates inwardly in a radiused terminal 58, FIG. 1; or, as shown in FIG. 4 recess 448 has a V-shape and terminates inwardly in a pointed terminal 56.

In addition, to maintain the support for the spring section areas 66, 68 while still reducing mass, baseplate 10 has its left and right legs 44, 46 define left and right front edges 62, 64 respectively that are adjacent to and engage these left and right spring section areas, respectively, at the load beam spring section edge 116.

Baseplate rear edge 36 and the left and right lateral edges 38, 42 are as shown radiused at their intersection to reduce mass further. Baseplate rear edge 36 preferably comprises a smooth curve 72 commencing at the center 74 of the rear edge 36 and terminating on the left and right lateral edges 38, 42 of the planar portion at left and right points 76, 78 opposed across the boss portion 26.

The invention baseplate 10 is used in combination with the load beam 12 with the baseplate planar portion 24 weld-attached to the load beam base section 18 at laterally and longitudinally distributed points 22 between the most rearward part of the boss portion 26 and the planar portion front edge 34.

In a typical baseplate according to the invention, the baseplate 10 has height from the center of the boss 26 to the ends of the legs 44, 46 of about 0.1000 inch, a width of about 0.2000 inch, a recess 48 depth of about 0.0500 inch, and a recess lateral extent of about 0.0700 inch. The corresponding boss 26 will have an outside diameter of about 0.0660 inch (with an inside diameter of about 0.0500 inch).

The invention thus provides for use in disk drive suspensions an improved baseplate that has reduced mass but that maintains the desired thickness for mechanical properties by contouring the common baseplate in areas not critical to performance to reduce mass without undue loss in the mechanical properties. The invention baseplate has a novel shape that accommodates all mechanical requirements, such as maintaining the base plate edge at the load beam spring section, keeping a minimum thickness or greater, and providing distributed welding sites, all while having a reduced mass. The foregoing objects are thus met.

I claim:

1. A low mass baseplate for attaching a suspension load beam having a rigid section, a spring section and a base section by its said base section to an actuator arm, said baseplate comprising a planar portion attachable to said load beam base section and integrally formed therewith a boss portion attachable to an actuator arm, said planar portion having a front edge and a rear edge and left and right lateral edges therebetween, said boss portion comprising a cylinder spaced inwardly from said planar portion edges and having a radius providing a given outside diameter, said planar portion having a front edge recess in mass reducing relation, said recess having a radius greater than said boss portion radius and defining with said left and right edges respectively left and right legs, said legs having a lateral extent greater than said boss portion outside diameter, whereby adjacent baseplates do not become entangled with each other in tumble deburring operations.

2. The low mass baseplate according to claim 1, in which said left and right legs define left and right front edges, said edges being adjacent left and right spring areas respectively of said load beam spring section.

3. The low mass baseplate according to claim 1, in which paid baseplate rear edge and said left and right lateral edges are radiused at their intersection in mass reducing relation.

4. The low mass baseplate according to claim 1, in which said planar portion and said load beam base section are welded to each other at laterally and longitudinally distributed points between the most rearward part of said boss portion and said planar portion front edge.

5. The low mass baseplate according to claim 1, in which said recess is V-shaped with its open mouth adjacent said load beam spring section.

6. The low mass baseplate according to claim 1, in which said recess has the shape of the interior opening in a U with its open mouth adjacent to the load beam spring section.

7. A low mass baseplate for attaching a suspension load beam having a rigid section, a spring section and a base section by its said base section to an actuator arm, said baseplate comprising a planar portion attachable to said load beam base section and integrally formed therewith a boss portion attachable to an actuator arm, said planar portion having a front edge and a rear edge and left and right lateral edges therebetween, said baseplate rear edge and said left and right lateral edges being radiused at their intersection in mass reducing relation, said baseplate rear edge comprising a smooth curve commencing at the center of said rear edge and terminating on the left and right lateral edges of said planar portion at left and right points opposed across said boss portion, said boss portion comprising a cylinder spaced inwardly from said planar portion edges and having a given outside diameter, said planar portion having a front edge recess In mass reducing relation, said recess defining with said left and right edges respectively left and right legs, said legs having a lateral extent greater than said boss portion outside diameter, whereby adjacent baseplates do not become entangled with each other in tumble deburring operations.

8. A low mass baseplate for attaching a suspension load beam having a rigid section, a spring section and a base section by its said base section to an actuator arm, said baseplate comprising a metal planar portion weld-attachable to said load beam base section and integrally formed therewith a cylindrical boss portion attachable to an actuator arm, said planar portion having a front edge and a rear edge and left and right lateral edges therebetween, said boss portion comprising a cylinder spaced inwardly from said planar portion edges and having a radius providing a given outside diameter, said planar portion having a distal front edge recess coaxial with said boss portion and spaced therefrom, said recess being devoid of metal in mass reducing relation, said recess having a radius greater than said boss portion radius and defining with said left and right edges respectively left and right legs, said legs having a lateral extent greater than said boss portion outside diameter, whereby juxtaposed baseplates do not become entangled with each other in tumble deburring operations.

9. The low mass baseplate according to claim 8, in which said planar portion recess has an extent along its lateral axis greater than its extent normal to said lateral axis.

10. The low mass baseplate according to claim 9, in which said recess terminates inwardly in a pointed or radiused terminal.

11. The low mass baseplate according to claim 10, in which said left and right legs define left and right front edges, said edges being adjacent left and right spring section areas respectively of said load beam spring section.

12. The low mass baseplate according to claim 11, in which said baseplate rear edge and said left and right lateral edges are radiused at their intersection in mass reducing relation.

13. In combination: The low mass baseplate according to claim 8, and a load beam having a base section, said baseplate planar portion being weld-attached to said load beam base section at laterally and longitudinally distributed points between the most rearward part of said boss portion and said planar portion front edge.

14. A low mass baseplate for attaching a suspension toad beam having a rigid section, a spring section and a base section by its said base section to an actuator arm, said baseplate comprising a metal planar portion weld-attachable to said load beam base section and integrally formed therewith a cylindrical boss portion attachable to an actuator arm, said planar portion having a front edge and a rear edge and left and right lateral edges therebetween, said boss portion comprising a cylinder spaced inwardly from said planar portion edges and having a given outside diameter, said planar portion having a distal front edge recess coaxial with said boss portion and spaced therefrom, said recess being devoid of metal in mass reducing relation, said planar portion recess having an extent along its lateral axis greater than its extent normal to said lateral axis, said recess terminating inwardly in a pointed or radiused terminal, said recess defining with said left and right edges respectively left and right legs, said legs having a lateral extent greater than said boss portion outside diameter, said left and right legs defining left and right front edges, said edges being adjacent left and right spring section areas respectively of said load beam spring section, said baseplate rear edge and said left and right lateral edges being radiused at their intersection in mass reducing relation, said baseplate rear edge comprising a smooth curve commencing at the center of said rear edge and terminating on the left and right lateral edges of said planar portion at left and right points opposed across said boss portion, whereby juxtaposed baseplates do not become entangled with each other in tumble deburring operations.

* * * * *